United States Patent Office 2,973,361
Patented Feb. 28, 1961

2,973,361
TRIETHYLENEDIAMINE HYDRAZINIUM COMPOUNDS

Bernard Rudner, Pittsburgh, Pa., assignor to W. R. Grace & Co., New York, N.Y., a corporation of Connecticut No Drawing. Filed Feb. 4, 1959, Ser. No. 791,005

5 Claims. (Cl. 260—268)

This invention relates to bridgehead nitrogen compounds. In one specific aspect, it relates to novel triethylenediamine hydrazinium compounds. This application is a continuation-in-part of my co-pending application Serial No. 547,831, filed November 18, 1955, now U.S. Patent No. 2,891,060.

A bridgehead nitrogen compound is an organic compound, the molecular structure of which contains at least two mutually fused rings sharing a common nitrogen atom (the bridgehead nitrogen) and at least one other atom. Triethylenediamine contains such a structure and actually contains this system twice. It has been discovered that triethylenediamine hydrazinium compounds are active as catalysts or modifiers in certain polymerization reactions.

It is, therefore, an object of the present invention to provide a new class of hydrazinium compounds useful as catalysts and modifiers in polymerization reactions.

In accordance with the present invention, I have made available a new class of compounds having the general formula:

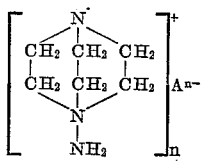

In the above formula A is an anion bearing the charge $n$; $n$ also represents the number of cations required to balance the anionic charge.

One method of preparing the novel compounds of my invention is to react chloramine with the tertiary amine corresponding to the desired hydrazinium compound; the product is isolated and purified by standard laboratory techniques. Since many of the amines are commercially available as their salts, the hydrochloride being the most common, it has been found convenient to treat aqueous solutions of the amine salts with base and extract the free amine with a solvent such as chloroform. After treatment of the extract with a conventional drying agent, he solution is ready for chloramination. While chloramine is most advantageously prepared as a gaseous chloramine-ammonia mixture obtained from a generator constructed according to the teachings of Sisler et al., U.S. Patent 2,710,248, other methods are equally adaptable for the purpose of the present invention. For instance, chloramine can be made by reacting chlorine with an excess of ammonia in carbon tetrachloride or similar halogenated hydrocarbon solvents under controlled conditions of mixing at low temperatures. Such a process is fully described in U.S. Patent 2,678,258 to John F. Haller. Another effective procedure is that of Coleman et al. fully described in Inorganic Syntheses, vol. I, 59 (1939). Alternatively, the chloramine can be formed in the presence of the amine as described in the copending application Serial No. 605,230 filed August 20, 1956, which teaches the reaction of chlorine and a tertiary amine in the presence of excess ammonia. For simplicity, when both the amine and the product are soluble in the same inert solvent, e.g., chloroform, chloramine may be formed in situ by this method right in the solution containing the reactant tertiary amine. In general, the choice of solvent is one of economy and simplicity. When preformed chloramine is used and good absorption is required for efficient reaction, it has been found desirable to bubble chloramine through a long column of a solution comprising the tertiary amine dissolved in relatively cheap inert solvent. By inert solvent it is meant a solvent unreactive under the conditions of the reaction. Solvents which serve this purpose include hydrocarbons, e.g., heptane, cyclohexane, benzene, xylene and the like; ethers e.g., diethyl ether, diamyl ether, dioxane and anisole; amides, e.g., dimethylformamide and dimethylacetamide; halohydrocarbons, e.g., chloroform, carbon tetrachloride, trichloroethylene and chlorobenzene; nitroaromatics, e.g., nitrobenzene. For special purposes, water and other hydroxylic solvents such as ethyl alcohol and cellusolve may be used. When the reaction is conducted in anhydrous solution, the product often precipitates as the reaction progresses. In aqueous solution, however, it is usually necessary to concentrate or to evaporate to dryness in order to isolate the product.

Another method of preparing the novel compounds of my invention is the reaction of hydroxylamine-o-sulfonic acid with tertiary amines which produces the hydrazinium sulfate corresponding to the tertiary amine used. Preferably the appropriate tertiary amine and hydroxylamine-o-sulfonic acid are allowed to react or are heated together in the presence of an alcoholic solvent but excess amine or other suitable solvents may be used. Even though the use of a solvent is not required, superior results are obtained with a solvent because of the extremely exothermic reaction that quite often results. A frequent purification step is the treatment of the reaction mixture with a basic substance such as sodium carbonate to remove acidic constituents from the product hydrazinium sulfate which is essentially neutral and stable to the action of base. Further purification is effected by standard laboratory techniques.

It is obvious that not all of the novel hydrazinium compounds of my invention are capable of being prepared directly as shown above. In order to provide the other useful salts of the present invention, it is necessary to prepare the compounds containing anions other than chloride or sulfate by metathesis. Many of the anions described supra can be obtained by mixing aqueous solutions of the hydrazinium chloride with appropriate reagents. More often than not, the desired product precipitates directly as the reaction progresses. This is the case where the new salt being formed is less soluble or insoluble in water. Other metathetical approaches are available and the method selected depends on experimental convenience, costs of reagents and the difference in physical properties between the product and the starting material to be utilized in their separation. Reaction of a hydrazinium halide with a soluble silver salt, such as silver nitrate, results in the precipitation of silver halide and the formation of the hydrazinium nitrate. In an analogous manner, treatment of the sulfate with a soluble barium salt results in the precipitation of barium sulfate and conversion to the anion of the barium salt. Quite often the appropriate reactants are heated together in the absence of a solvent and the product isolated by standard laboratory techniques. Another approach independent of the formation of an insoluble solid, is to react the halide with an excess of the desired anion as its acid;

hydrogen halide is evolved as the new salt is formed. When it is necessary to prepare a very soluble salt, the reaction of the hydrazinium hydroxide with equivalent amounts of the appropriate acid may be utilized; this approach is also used for the preparation of very pure compounds. (Subjecting a hydrazinium halide to the action of moist silver oxide will give the hydrazinium hydroxide.)

The scope and utility of my invention is further illustrated by the following example:

Gaseous chloramine was passed into a solution of 50 g. of triethylenediamine dissolved in chloroform. The reaction mixture was filtered and the solids suspended in isopropyl alcohol. Insoluble ammonium chloride was separated by filtration and ethyl acetate was added to the filtrate to crystallize the hydrazinium compound. N-aminotriethylenediaminium chloride was a finely divided white solid charring at 250° C. and melting with decomposition 260–265° C. The structure shown below was confirmed by chloride analysis.

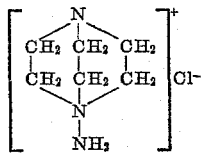

The compounds of this invention are useful as modifiers and catalysts for certain polymerization reactions. They are most particularly useful in the preparation of urethane foams where they control the reaction between the isocyanate group (from tolylene diisocyanate for example) and the hydroxyl group (from hydroxyl terminated polyethers and polyesters). In addition, my novel compounds may be used as chain transfer agents in radical catalyzed polymerizations as activators for peroxide catalyzed polymerizations and as transesterification and cyanoethylation catalysts.

I claim:
1. Compounds having the formula:

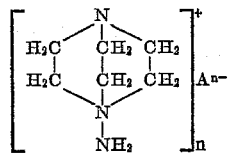

wherein A is an inorganic anion from the group consisting of chloride, nitrate, hydroxide and sulfate and $n$ is the valence of said anion.
2. N-aminotriethylenediaminium chloride.
3. N-aminotriethylenediaminium sulfate.
4. N-aminotriethylenediaminium hydroxide.
5. N-aminotriethylenediaminium nitrate.

No references cited.